June 25, 1968   A. E. TURNBULL   3,389,613
LEVER AND LINK MECHANISMS
Filed July 14, 1966
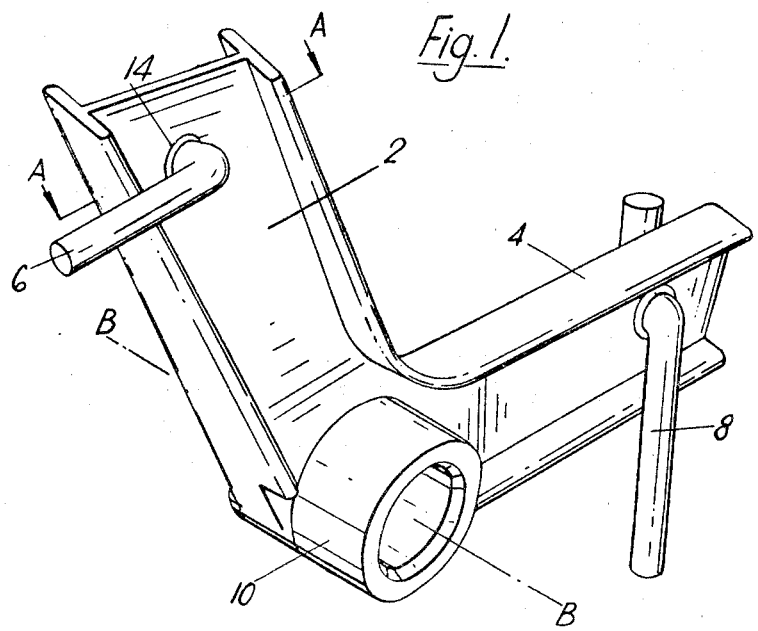
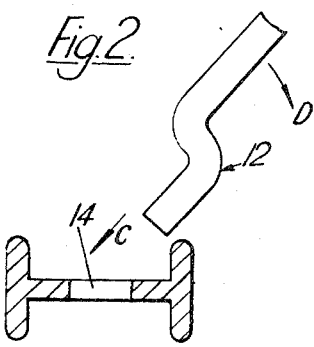
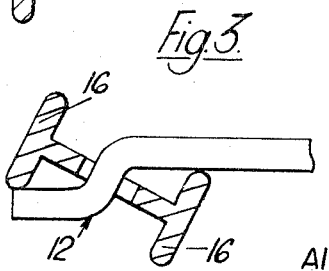
Inventor
Albert Edward Turnbull
By *Robert W. Beart*
Attorney

United States Patent Office

3,389,613
Patented June 25, 1968

3,389,613
LEVER AND LINK MECHANISMS
Albert Edward Turnbull, Old Windsor, England, assignor to Illinois Tool Works Inc., Chicago, Ill., a corporation of Delaware
Filed July 14, 1966, Ser. No. 565,313
9 Claims. (Cl. 74—110)

ABSTRACT OF THE DISCLOSURE

A linkage mechanism in which a pivotally mounted lever is engaged by a link, with the link having a cranked terminal portion passing through a hole in an arm of the lever and with the cranked portion of the link and a straight principal portion making forcible contact with the arm to torsionally stress and twist the arm about an imaginary line passing through both the hole and the pivotally mounted axis of the arm to provide resilient connection between the link and arm.

---

This invention is concerned with mechanisms comprising a pivotally mounted lever and a link pivotally connected to an arm of the lever and to a further component. If the link is displaced axially by some external control, it rotates the lever about its axis of pivotal mounting. The lever may be mounted on a shaft so that movement of the link causes rotation of the shaft, or alternatively the drive may be in the other direction, that is to say from the shaft to the link. Alternatively, the arm may be one of two arms of the lever, which are at an angle to one another, when viewed along the pivotal mounting axis; the arms may, for example, be at right angles to one another to transmit a thrust or pull between two links lying at right angles to one another.

According to the present invention, the connection of the link to the arm is by a cranked terminal portion of the link passing through a hole in the arm, the arrangement of the mechanism being such that the link is in forcible contact with the arm at points on either side of an imaginary line intersecting both the hole and the pivotal mounting axis of the arm, so that the arm is in a state of trosional stress about this imaginary line.

During assembly, the link is attached to the arm by being inclined to its normal operative position, so that the terminal portion can be inserted through the hole in the arm, after which the link is swung to its operative position and thereby twists the arm and so stresses it. Preferably the lever is of a flexible resilient plastics material, and the torsional stress is such that the arm is twisted to an extent from which it recovers, at least partially, if the link is moved so as to release the stress.

This invention enables a secure connection to be made between the link and the lever, without excessive friction resisting the necessary relative angular movement between the link and the lever. The connection can moreover be made quickly and easily, and the resilient twist in the arm prevents rattling at the connection.

The lever may be of nylon, Delrin, or any other flexible plastic, or it may even be of metal.

The accompanying drawings show one example of a lever and link mechanism according to this invention. In these drawings:

FIGURE 1 is a perspective view of the mechanism assembled; and

FIGURES 2 and 3 are fragmentary sections on the line A—A in FIGURE 1 showing the sequence of assembly.

The lever in the example has two arms 2, 4, and in fact, there is a link 6, 8 connected to each arm. Such a lever, with two arms substantially at right angles and of substantially equal length, is sometimes called a bellcrank lever.

Each arm of the lever is I-shaped in cross section. The arms are integral with a bush 10 which defines the axis B—B of pivotal mounting of the lever. In this case the lever transmits motion from the link 6 to the link 8, and therefore the bush can be freely pivoted on a fixed pin (not shown).

Each link 6, 8 is a rod of round wire, bent to form the cranked terminal portion 12. FIGURES 2 and 3 show the assembly of the terminal portion with the pivot hole 14 in the arm 2.

The link 6 is started in the relative position as shown in FIGURE 2. The rod is moved bodily so that the terminal portion 12 enters the hole 14, as indicated by the arrow C, and then the principal portion 16 of the link 6 is swung, as indicated by the arrow D, until it is in a plane perpendicular to the pivotal mounting axis B—B of the lever. The final position is shown in FIGURE 3. The link makes forcible contact with the arm, and twists it. This occurs in this case because the offset in the cranked terminal portion 12 is less than the sum of the thickness of the wire and the width of the flanges 16 of the I section of the arm. This I section also gives the lever a desirable amount or torsional stiffness without a need for a large volume of material.

In one example, the hole in each lever is at a distance of about 1.1 inches from the axis of the bush and is of ⅛ inch diameter to receive a slightly less than ⅛ inch thick wire rod The height of the I section of each lever is ½ inch and the width is just over ⅛ inch. The thickness of the web of each lever is 0.050 inch, and the thickness of each flange of the I section is 0.060 inch. The rod is inserted into each lever while being inclined at about 45° to the web of the lever and is then rotated through 45° to the operative position; owing to the clearance allowed for insertion of the rod into the hole in the lever, the rotation of the rod through 45° does not result in a 45° twist in the lever but in a somewhat smaller twist, for example 20°.

In each flange 16, the half which does not engage the link may be omitted, so that the arm has a Z-shaped cross section.

The link is of course subject to stresses equal and opposite to those on the arm, and consequently the link is distorted, but the stiffness of the wire against bending is such that in this example the distortion of the link is small as compared with that of the lever.

For some linkages a lever with a single arm may be of use. Such an arm may require two holes for connection of two links extending in directions at an angle to one another. For other purposes, levers with two or more arms may be preferable. Where there are two or more arms, there may be webs or other strengthening members bridging between the arms.

I claim:

1. A mechanism comprising a pivotally mounted resilient lever and a link pivotally connected to an arm of the lever, the lever having means defining an axis for pivotal mounting and having a hole in an arm of said lever for pivotal connection of the link, said link having a straight principal portion and a cranked terminal portion, the proportions of the terminal portion and of the arm in the neighborhood of the hole being such that on the terminal portion being inserted through the hole, and the principal portion of the link then being held in a plane perpendicular to the axis for pivotal mounting of the arm, the link makes forcible contact by its straight principal portion and cranked terminal portion with the arm at points on either side of an imaginary line intersecting both the hole and the pivotal mounting axis of the arm and twists the arm to a position lying in a plane angularly disposed relative to the plane of its initial position.

2. A mechanism according to claim 1 in which the arm is beam shaped and has a cross-sectional configuration in the form of the letter I, whereby said arm is flat in its central portion and provided with substantially uniform ribs extending outwardly in opposite directions along each of its edges.

3. A mechanism according to claim 1 in which the arm has a substantially Z shaped cross-sectional configuration.

4. A mechanism according to claim 2 in which the link is a rod of round wire which is bent adjacent one extremity to form the said terminal portion.

5. A mechanism of the type claimed in claim 1 wherein the arm is provided with one or more flanges along its edges, said flanges having a predetermined width as measured from said arms and said link having the offset in the cranked terminal portion being less than the sum of the thickness of the wire and the width of the flange positioned along the edge of the arm.

6. A mechanism according to claim 1 in which the arm is one of two arms of a lever which are at an angle to one another when viewed along the pivotal mounting axis.

7. A mechanism according to claim 5 in which the torsional stress is accompanied by twisting of the arm through about 20° rotation along its longitudinal axis perpendicular to the pivotal mounting axis.

8. A mechanism according to claim 7 in which said lever is made of a flexible resilient plastic material and the torsional stress is such that said lever will not take a set when twisted and which is capable of at least partially recovering by returning to its initial position when the link is removed so as to release the stress.

9. A mechanism according to claim 1 in which means defining the axis of pivotal mounting is defined by a bushing integral with the remainder of the arm.

References Cited

UNITED STATES PATENTS

| | | | |
|---|---|---|---|
| 1,837,004 | 12/1931 | Winning | 287—103 |
| 2,073,566 | 3/1937 | Schuebner | 287—103 |
| 2,919,654 | 1/1960 | Korte | 74—519 |

FOREIGN PATENTS

| | | |
|---|---|---|
| 1,054,852 | 4/1959 | Germany. |

FRED C. MATTERN, *Primary Examiner.*

W. S. RATLIFF, *Assistant Examiner.*